US008795868B1

(12) United States Patent
Miles

(10) Patent No.: US 8,795,868 B1
(45) Date of Patent: Aug. 5, 2014

(54) RECHARGEABLE LITHIUM-AIR AND OTHER LITHIUM-BASED BATTERIES USING MOLTEN NITRATES

(71) Applicant: Melvin H. Miles, Ridgecrest, CA (US)

(72) Inventor: Melvin H. Miles, Ridgecrest, CA (US)

( * ) Notice: Subject to any disclaimer, the term of this patent is extended or adjusted under 35 U.S.C. 154(b) by 0 days.

(21) Appl. No.: 13/800,666

(22) Filed: Mar. 13, 2013

(51) Int. Cl.
*H01M 6/30* (2006.01)

(52) U.S. Cl.
USPC ............................. 429/110; 429/112; 429/344

(58) Field of Classification Search
USPC ......................................... 429/110, 112, 344
See application file for complete search history.

(56) References Cited

U.S. PATENT DOCUMENTS

| | | |
|---|---|---|
| 4,190,704 A | 2/1980 | Miles |
| 4,200,686 A | 4/1980 | Fletcher |
| 4,260,667 A | 4/1981 | Miles |
| 4,315,059 A | 2/1982 | Raistrick |
| 4,416,958 A | 11/1983 | Miles |
| 4,528,253 A | 7/1985 | McManis |
| 4,535,037 A | 8/1985 | McManis |
| 4,654,278 A | 3/1987 | McManis |
| H1449 H | 6/1995 | Miles |
| H1544 H | 6/1996 | Miles |
| 6,544,691 B1 | 4/2003 | Guidotti |
| 7,629,075 B2 | 12/2009 | Miles |
| 8,039,138 B2 | 10/2011 | Miles |
| 8,101,310 B2 | 1/2012 | Lipilin et al. |
| 2010/0092851 A1* | 4/2010 | Miles et al. ............. 429/112 |
| 2010/0151336 A1* | 6/2010 | Nakanishi ................ 429/407 |
| 2010/0291443 A1* | 11/2010 | Farmer .................... 429/304 |
| 2012/0082901 A1 | 4/2012 | Schmidt |
| 2012/0107728 A1 | 5/2012 | Ryu |
| 2012/0270114 A1 | 10/2012 | Reynolds |

OTHER PUBLICATIONS

Miles, M. H., Lithium batteries using molten nitrate electrolytes, Fourteenth Annual Battery Conference on Applications and Advances, Jan. 12-15, 1999.
Miles, M. H., Electrochemistry of Molten Nitrate Electrolytes and Applications for Lithium Batteries, Journal of the Tennessee Academy of Science, Jan. 2002, vol. 77, Issue 1.
Miles, M. H., Electrochemistry of Molten Nitrate Electrolytes and Applications for High Voltage Lithium Cells, Proceedings, Electrochemical Society PV, 21, pp. 557-563, 2003.
Walker et al, A Rechargeable Li-O2 Battery Using a Lithium Nitrate/N,N-Dimethylacetamide Electrolyte, J. Am. Chem. Soc., 2013, 135 (6), pp. 2076-2079.
Paniccia et al, Thermodynamics of the systems NO3 etc., J. Chem. Soc., Faraday Trans. 1, 1976, 72, pp. 1512-1518.
Miles, Lithium batteries using molten nitrate electrolytes, The Fourteenth Annual Battery Conference on Applications and Advances, 1999, 39-42.
Miles, Electrochemistry of Molten Nitrate Electrolytes and Applications for High Voltage Lithium Cells, Proc. Electrochem. Soc. PV 2001-21, pp. 557-563.

* cited by examiner

*Primary Examiner* — Zachary Best
(74) *Attorney, Agent, or Firm* — William H. Eilberg

(57) ABSTRACT

A rechargeable molten salt electrolyte battery has an anode comprising lithium, a cathode electrode comprising a conductive metal that is compatible with the nitrate melt, an electrolyte comprising lithium nitrate or lithium nitrate mixtures with other nitrates which electrolyte is capable of becoming an ionic conductive liquid upon being heated above its melting point, wherein oxygen for reaction at the cathode or within the melt is provided from an external source to be delivered to the cathode through the electrolyte and provision is made to collect lithium oxide formed during discharge to be reconstituted as lithium ions and oxygen during recharge. At least a portion of the oxygen reduction reaction is provided by a nitrate ion pathway.

19 Claims, 3 Drawing Sheets

RECHARGEABLE LITHIUM-AIR AND OTHER LITHIUM-BASED BATTERIES USING MOLTEN NITRATES

FIELD OF THE INVENTION

This invention relates to batteries. More particularly and preferably it relates to a rechargeable battery that relies on the use of lithium and a molten nitrate electrolyte (ionic liquid) that contains lithium ions.

BACKGROUND TO THE INVENTION

Lithium-based batteries are a well-established technology. In a typical lithium-ion battery during discharge, lithium ions transfer from the metallic lithium component of the anode electrode into an electrolyte leaving an electron behind. These lithium ions ($Li^+$) then circulate as positive ions in the electrolyte and replace the lithium ions consumed at the lithium-ion battery cathode. In the lithium-air battery, oxygen is generally introduced into the electrolyte at the cathode by being passed through pores in such cathode. Oxygen molecules are reduced at the cathode by acquiring electrons to become negative oxygen ions. The oxygen ions then combine with adjacent lithium ions to produce lithium peroxide and/or lithium oxide. The electrical charges associated with these reactions pass externally between the electrodes providing an external current.

The process in the lithium-air battery can be reversed by forcing charge in the opposite direction causing the dissociation of the lithium oxides to reform lithium ions which replace the lithium ions that become deposited as metallic lithium on the anode. Simultaneously, gaseous oxygen ($O_2$) is evolved.

In many of the electrolytes used in the above described arrangement the lithium oxide or peroxide, once formed, is relatively insoluble and tends to plug-up the permeability of the electrode supplying oxygen to the reaction, obstructing some electrode regions and blocking further reduction of oxygen. As a consequence, the reaction does not persist in performing at an optimal level.

It is known to use a molten electrolyte in association with lithium to produce a single use primary battery or thermal battery that can be stored indefinitely so long as the electrolyte is in a solid phase. To activate the thermal battery, the electrolyte is quickly heated and becomes an excellent ionic conductor in the form of an ionic liquid.

An example is U.S. Pat. No. 8,039,138 issued Oct. 18, 2011 to the present inventor Melvin Miles and others which focuses on the feature that such a battery is preferably chloride-free, sodium ion-free, and water-free when using molten nitrate electrolytes. A related reference is U.S. Pat. No. 7,629,075 to the present inventor. Advantages of these references include significantly higher cell voltages and improvements in energy and power density. Additionally, harmful gas-evolution reactions are addressed by eliminating chloride ions, sodium ions, and moisture contaminants.

This present invention addresses a new arrangement for a rechargeable lithium-based battery that is based on use of a molten nitrate electrolyte containing sufficient lithium ions combined with providing oxygen to support the generation of electrical current.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention according to one aspect is directed to a molten nitrate salt electrolyte battery incorporating:
   an anode comprising lithium in a form that is compatible with a molten nitrate salt electrolyte or "nitrate melt" (that constitutes an ionic liquid),
   a cathode comprising a conductive metal or other conductive substrate that is compatible with the nitrate melt, and
   an electrolyte comprising lithium nitrate or mixtures of lithium nitrate with potassium nitrate or other compatible nitrates with a lithium nitrate content of at least 20 mole % lithium nitrate which is capable of becoming an ionic conductive liquid upon being heated above its melting point,
and further comprising a source of oxygen to provide oxygen for reaction at the cathode or within the molten nitrate electrolyte wherein the oxygen is introduced into the battery through the electrolyte. In addition to being a major component of the electrolyte, the nitrate ion also serves as a conveyer of oxygen for reaction at the cathode.

The molten nitrates provide a different mechanism for the oxygen electrode reaction that involves the direct reduction of nitrate ions at the cathode to form nitrite and oxide ions. Lithium ions in the electrolyte act as a Lux Flood acid (oxide ion acceptor) and combine with the oxide ions produced to form lithium oxide. Effectively oxygen is delivered to the cathode by the nitrate ions.

Replacement oxygen is supplied to the cell by being bubbled through the molten nitrate electrolyte. This oxygen converts the nitrite ions formed by the cathode reaction back to nitrate ions. This mechanism bypasses both the slow electrode kinetics for the oxygen electrode and the need for a gas-permeable cathode electrode. Furthermore, molten nitrates can be very rich in nitrate ions (e.g. 100% of the negative ions initially present), allowing much faster reactions to take place by the reduction of nitrate ions.

The net effect of the electrode reduction reaction of nitrate ions to form lithium oxide and nitrite ions followed by the chemical reaction of oxygen with these nitrite ions to reform nitrate ions performs equivalently to the direct electrode reduction of oxygen gas at a gas-permeable cathode. This concept provides advantages over the prior art.

The lithium anode when immersed in a nitrate electrolyte is able to form directly over its surface a "solid electrolyte interface" consisting of lithium oxide which protects and stabilizes the lithium metal. The higher temperatures made possible by the use of molten nitrates greatly increases the reaction rate for the oxygen cathode. This reduces or eliminates the need to employ expensive catalysts to maintain rapid cell dynamics for the reduction of oxygen gas. Furthermore, as the rates of the electrode reactions occurring will be larger at the elevated temperatures needed to maintain the electrolyte in a molten condition, cell voltage losses will be smaller for both the discharge and charging cycles.

Cathode/Oxygen Electrode

The cathode substrate may comprise any conductive metal or other support that is compatible with the nitrate melt. More preferably, the cathode material may comprise a metal selected from the group consisting of nickel, iron, cobalt, copper, silver, chromium, platinum, ruthenium, or other compatible transition metals and alloys thereof. It is believed that graphite, graphene or other forms of carbon may be less acceptable because they could react with nitrates but this may be overcome by special provisions such as application of stable surface films. When first operated as a battery, oxygen can be provided to support the reaction from the supply of nitrate ions present within the electrolyte. Oxygen present in the nitrate ions exists in equilibrium with dissolved oxygen gas and nitrite ions in the nitrate melt. Consequently operation as a battery can occur both with and without an external supply of oxygen.

A major advantage in using molten nitrates as an electrolyte is that the reduction of the nitrate ions to yield nitrite ions can serve as a source of oxygen in the place of the delivery of oxygen gas to the cell through a gas-permeable cathode. These nitrate ions can be directly reduced at the cathode to form nitrite and oxide ions. Supplying oxygen directly into the molten nitrate electrolyte converts these nitrite ions back into nitrate ions. This enables the oxygen gas to react within the body of the electrolyte through the conversion of nitrite ions back into nitrate ions. The oxide ions produced by the reduction of nitrate ions at the cathode then combine with adjacent lithium ions to form the lithium oxide.

This pathway has a slight penalty in that the theoretical cell voltage and theoretical energy density based upon this process is reduced from optimum levels, but these values are believed to still be on the order of 86% of the values offered by other lithium-air systems employing the direct reduction of oxygen. Furthermore, the exothermic reaction of the oxygen gas with the nitrite ions can provide for battery heating that compensates for cooling effects such as the introduction of oxygen into the battery.

Thus, while a cell based upon the invention will operate by consumption of nitrate ions present in the melt, battery operation can be sustained through oxygen introduced directly into the melt as, for example, by means of percolation, where it will react with the nitrite ions to convert such nitrite ions back into nitrate ions. The cathode reaction may involve both the reduction of oxygen gas and the reduction of nitrate ions to form the lithium oxides. In fact, the reduction of both would be preferred in order to improve performance. Oxygen may be introduced into the electrolyte as a gas through a diffuser and bubbled through the melt to support the cathode reactions. This may be done in the vicinity of the cathode to directly support reaction kinetics. Air may be used as the source of oxygen on the basis that it essentially contains 20% oxygen with nitrogen being nonreactive and passing entirely through the melt for subsequent evacuation. For applications of this battery system to electric automobiles, the outside air would be a convenient source of oxygen.

Alternately oxygen can be supplied from a solid state source such as a high oxygen storage Ceria-Zirconium compound. Such an oxygen source can be charged with oxygen liberated in the recharge procedure for the battery. Under closed operating conditions oxygen may be temporarily supplied from a chlorate or oxygen candle or other equivalent source. Examples of other oxygen sources include potassium permanganate ($KMnO_4$), potassium superoxide ($KO_2$) and lithium peroxide ($Li_2O_2$).

The overall effect is for oxygen to be made available for direct electrochemical reduction at the cathode as well as being delivered within the electrolyte for reaction with nitrite ions to reform the nitrate ions consumed.

The lithium oxides formed either by direct oxygen reduction or by nitrate ion reduction will be mostly insoluble in molten nitrates with lithium peroxide being significantly more soluble than lithium oxide. It should be noted that lithium peroxide would be formed by the direct reduction of oxygen gas and not by the reduction of nitrate ions. Oxide precipitates so formed at the cathode are expected to remain at the cathode or settle by gravity within the cell. Since the cathode need not be a porous cathode that admits oxygen into the cell, there will be a less tendency for the oxide precipitates to block the introduction of further oxygen into the melt by interfering with the cathode permeability. Oxides that remain on the electrode surface will be progressively converted back to the lithium ions and oxygen gas during the charging process.

Oxygen evolved during the recharge cycle may be captured in an oxygen absorbent/storage system and reserved for reuse as a source of oxygen during discharge.

Recharge Cycle

In the recharge cycle, a current is driven by an external source in a reverse direction through the cell. Lithium oxides present in the cell and in contact with the cathode surface will react electrochemically and release lithium ions and oxygen gas. Simultaneously, lithium ions will reenter the lithium anode electrode, converting to lithium metal. Oxygen from the lithium oxides will evolve from the melt as a gas or react with nitrite ions in the electrolyte.

To facilitate this recharge cycle, the insoluble lithium oxides formed during discharge may be collected on portions of the cathode, settling under the influence of gravity. This will ensure that such oxides are in close proximity to the cathode during the recharge cycle. To facilitate this reaction, the cathode may be formed with one or more horizontal surface portions for receiving the lithium oxides as they settle under gravity. One such surface portion, optionally in the form of a metallic mesh or screen with larger size openings than the micro-porous pores of conventional cathodes, may be located over a portion of the cell bottom to receive such oxides. The openings in such a lower portion of the cathode may provide a pathway by which oxygen can be introduced into the electrolyte during discharge. Their sizes are chosen so that the passage of oxygen there through is not blocked by the deposit of oxides.

Anode/Lithium Electrode

When the lithium anode electrode is first introduced into the molten nitrate-containing ionic liquid, the lithium metal will rapidly react with the nitrate ions present to form an insoluble lithium oxide layer over the surface of the lithium electrode. For this reason, it is desirable for the electrolyte to contain at least 20 mole % (at least 10 weight %) concentration of lithium nitrate.

The reaction of nitrate ions with the lithium metal will rapidly decline with the formation of the lithium oxide layer over the surface of the lithium electrode. This layer serves as a "solid electrolyte interface" that protects the metallic lithium and through which lithium ions can diffuse from the lithium electrode into the electrolyte for participation in the cathode reaction.

The lithium oxide ($Li_2O$) protective film that forms is not an electron conductor. It only transports charge as lithium ions, acting as an ionic conductor like the electrolyte. This will minimize problems with cells shorting by reason of the formation of dendrites. If necessary, further protection of the lithium metal from reactive components in the electrolyte could be provided by ceramic coatings which conduct lithium ions but provide a barrier against reactive components. Also, additives such as calcium and/or magnesium ions optional in the form of calcium and/or magnesium nitrate may be included in the electrolyte to serve as further protection for the lithium electrode through the presence of calcium and/or magnesium oxide in the protective oxide layer.

Pure lithium nitrate has a melting point of 253° C. It would be preferable for the battery to operate at a lower temperature if practical. Eutectic mixtures of lithium nitrate combined with other compatible eutectic salts can provide an electrolyte that is molten at a lower temperature. As one preferred mixture, an electrolyte containing 59 mole % potassium nitrate and 41 mole % lithium nitrate, has a melting point under normal conditions of 124° C. To ensure that the electrolyte remains molten and to take advantage of the higher conductivity that would arise with higher temperatures, batteries according to the invention would preferably be operated at a temperature sufficiently above 124° C. to meet these requirements with a safety allowance for thermal excursions, e.g. 150° C. to 225° C.

A consideration relevant to the preferred temperature of the melt arises from the fact that at higher temperatures, the lithium metal of a pure lithium anode may itself become molten. Lithium metal has a melting point of 180.50° C. Above the melting point of lithium metal, the protective lithium oxide film becomes less stable for liquid versus solid lithium. However, this problem may be addressed by immobilizing the liquid lithium as by using iron powder. Another option is to use inter-metallic compounds of lithium or lithium alloys as anodes in molten nitrate electrolytes operated at higher temperatures.

A preferred anode, for lithium-air batteries using molten nitrate electrolytes is one incorporating a lithium aluminum alloy or inter-metallic compound(s) which have a higher melting point than pure lithium. These compounds can, as in the case of aluminum, be formed directly in the nitrate melt by the electro-deposition of lithium metal onto a support electrode. For an aluminum support electrode, a lithium aluminum alloy will form as a surface layer over the aluminum core. The aluminum core itself has a melting point of 660.3° C. and will therefore remain solid with electrolytes operated in a preferred lower range of temperature. The compound formed by electroplating as described can have a lithium-aluminum ratio of 1:1 and a partial melting beginning at 600° C.

The cell voltage in the Li—Al case will be about 0.35 V less than pure lithium due to the formation of a Li—Al inter-metallic compound. This voltage difference may be acceptable for the benefits obtained. Other types of lithium alloy anodes can also be used such as Li—Si, Li—Fe, Li—Ca, and Li—B that do not show this voltage difference, but Li—Al is preferred because of its greater stability.

Experimental tests have shown that lithium metal can be reversibly deposited onto various other metals in molten nitrate (e.g. $LiNO_3$—$KNO_3$) electrolytes. These experiments showed the reversible formation of alloys of lithium-cobalt (Li—Co), lithium-nickel (Li—Ni), lithium-iron (Li—Fe), lithium-molybdenum (Li—Mo), lithium-tantalum (Li—Ta), and lithium-titanium (Li—Ti). These materials do not involve inter-metallic compounds based on the fact that the lithium on these metal surfaces behaves electrochemically like pure lithium. Accordingly, these materials could also be used for rechargeable lithium anode materials in association with molten nitrates as long as the lithium is immobilized by or on the transition metal substrate.

Lithium-free anode materials that could provide a battery effect but which are not rechargeable in molten nitrates include calcium, magnesium, beryllium, and barium. However lithium alloys of these metals will be rechargeable and could be employed as the anode material.

Electrolyte

Although other molten nitrate compositions can be used, the lithium nitrate-potassium nitrate eutectic ($LiNO_3$—$KNO_3$) with a melting point of 124° C. is the most desirable and has already been recognized as a suitable electrolyte for molten nitrate thermal batteries. The $LiNO_3$—$KNO_3$ electrolyte also offers a wide 4.5 V range between the reduction of lithium ions and the oxidation of nitrate ions.

The nitrate melt should preferably not contain any significant amounts of $NaNO_3$ or other sodium compounds due to potential destabilizing reactions of sodium ions with the lithium anode. For example, sodium ions react with the lithium metal to form much more reactive sodium metal.

As in other lithium-air battery systems, both $Li_2O$ and $Li_2O_2$ are likely produced by the reduction of oxygen gas at the cathode. However, lithium peroxide decomposes to lithium oxide and oxygen at temperatures higher than 195° C. Accordingly, insoluble lithium oxide is believed to be the main product in molten nitrates above such an operating temperature. Furthermore, it is known that the electrochemical reduction of the nitrate ion to the nitrite ion produces the oxide ion and not the peroxide ion, thus $Li_2O$ would be expected to be the main product and not $Li_2O_2$.

Preferably, the amount of water in the electrolyte should be minimized. According to one variant, this condition may be advanced by desiccating any oxygen-containing gas being provided to the melt. Due to the elevated operating temperature of the electrolyte, moisture when present will tend to be purged through conversion of the water to steam. Additionally, evolved oxygen generated during recharging will help to purge out moisture. Furthermore, oxygen that is captured and stored for reuse will be low in moisture content.

The foregoing summarizes the principal features of the invention and some of its optional aspects. The invention may be further understood by the description of the preferred embodiments, in conjunction with the drawings, which now follow.

Wherever ranges of values are referenced within this specification, sub-ranges therein are intended to be included within the scope of the invention unless otherwise indicated or are incompatible with such other variants. Where characteristics are attributed to one or another variant of the invention, unless otherwise indicated, such characteristics are intended to apply to all other variants of the invention where such characteristics are appropriate or compatible with such other variants.

DESCRIPTION OF THE PREFERRED EMBODIMENTS

Figure 1:
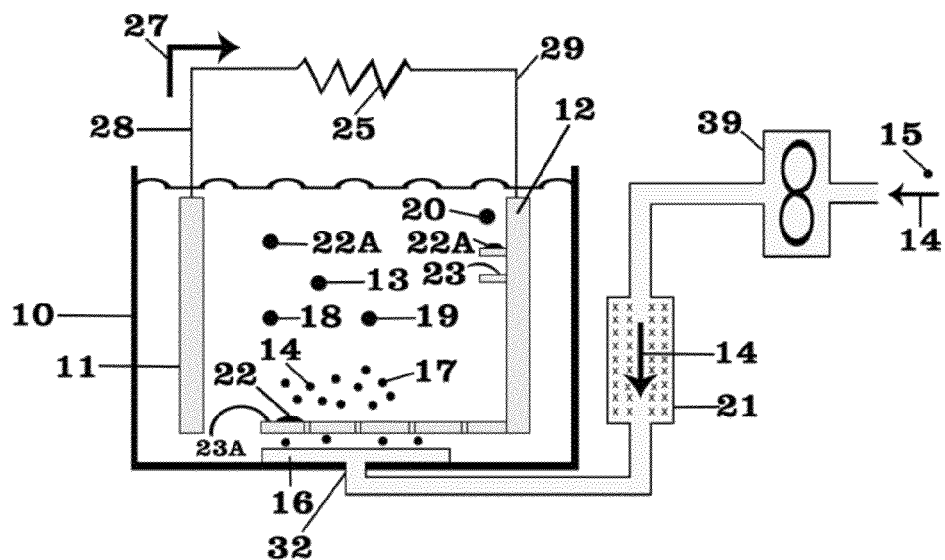
FIG. 1 is a schematic depiction of a battery with two electrodes and a lithium nitrate-potassium nitrate eutectic mixture serving as the electrolyte. Air from a diffuser is shown as being bubbled through the electrolyte while the battery is operating in discharge mode.

FIG. 1 shows a battery assembly or cell 10 with two of electrodes 11, 12, an anode 11 and cathode 12, and a lithium nitrate-potassium nitrate eutectic mixture serving as the electrolyte 13. The battery 10 is operating in discharge mode with electrons 27 flowing from the anode 11 through external leads 28, 29 and resistive load 25 to the cathode 12. Air 14, which is driven by a fan or compressor 39 from an external source 15, after being dried in a desiccator 21, enters the cell 10 at entry point 32 and passes through a diffuser 16 whereby the air 14 and oxygen 17 contained therein bubble through the electrolyte 13. Preferentially, the diffuser 16 as the source of air 14 and oxygen 17, or oxygen 17 when a source of oxygen 17 is employed, is located to cause the air 14 or oxygen 17 preferentially to rise through the electrolyte 13 in the vicinity of the cathode 12 to facilitate the reduction of the oxygen 17 in the air 14 at the cathode 12.

As described above, the oxygen 17 present in the electrolyte 13 is believed to react with nitrite ions 18 converting such ions into nitrate ions 19. The plentiful nitrate ions 19 in the melt react at the cathode to release a doubly negative charged oxygen ion (oxide ion) which then combines with lithium ions 20 present in the electrolyte 13 to form lithium oxide 22. However, the direct reduction of oxygen gas may produce lithium peroxide 22A. The insoluble portions of such oxides 22, 22A remain on the cathode surface or precipitate out into the electrolyte 13 and settle towards the bottom of the battery assembly 10.

The cathode 12 is optionally formed of an electrolyte-compatible conductive material, for example nickel, which provides horizontal surfaces 23 onto which the precipitated particles of the oxides 22, 22A may settle. While these surfaces 23 may be in the form of ledge surfaces along the face of the cathode 12, a preferred arrangement is to provide an extended horizontal surface portion 23A of the cathode 12 along the base of the cell 10. The horizontal surface portions 23, 23A receive the lithium oxides as they settle under gravity.

The diffuser 16 may be located beneath such horizontal surface portion 23A with air 14 released by the diffuser 16 percolating through perforations in the horizontal surface portion 23A. Turbulence thereby created will help facilitate the reaction of the oxygen 17 with nitrite ions 18 to form nitrate ions 19.

Figure 2:
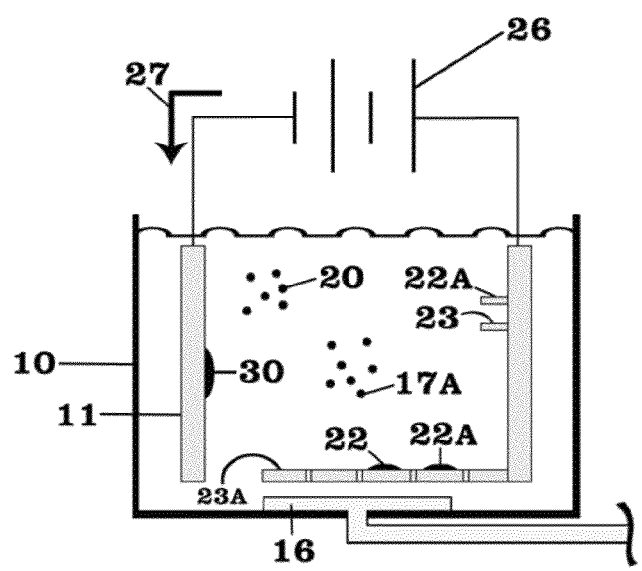
FIG. 2 is a schematic depiction of the battery of FIG. 1 during the recharging portion of the cycle.

In FIG. 2 the electrical load 25 of FIG. 1 is replaced with a current source 26 which causes electrons to flow 27 in a reverse direction through the cell 10. During this phase air 14 or oxygen 17 is no longer passed into the electrolyte 13 through the diffuser 16. The action of the current associated with the electron flow 27, however, will form oxygen 17A, releasing lithium ions 20 out of the oxides 22, and 22A present in the cell in the vicinity of the cathode 12. In particular, oxide particles 22, 22A that have settled onto horizontal surface portions 23, 23A of the cathode 12 will disassociate resulting in the formation of oxygen 17A and the release of lithium ions 20. Simultaneously, lithium ions 20 will be deposited on the anode 11 as metallic lithium 30. With sufficient lithium 30 restored to the anode 11 the battery will have been recharged into a condition suitable for subsequent discharge.

Figure 3:
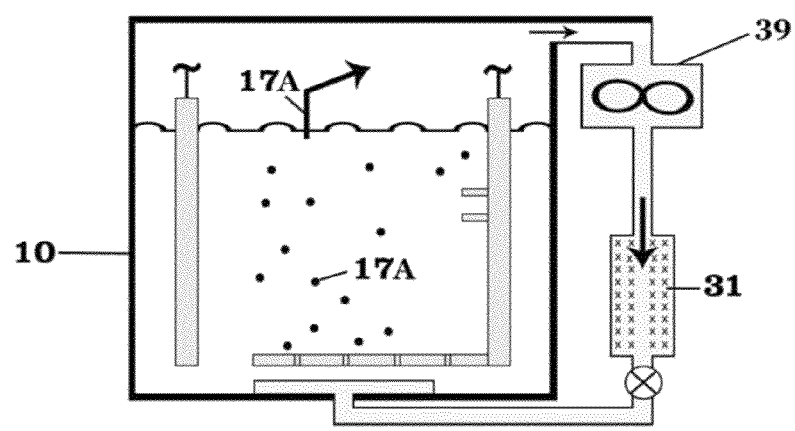
FIG. 3 is a schematic depiction of the batteries of FIGS. 1 and 2 showing the recapture and storage of oxygen evolved during the recharge cycle.

In FIG. 3 an optional arrangement is depicted wherein the oxygen 17A released from the cell 10 during the recharge cycle of FIG. 2, optionally assisted by a fan or compressor 39, is transferred to an oxygen storage container 31 for optional reuse as a source of oxygen 17 during a subsequent discharge stage.

Figure 4:
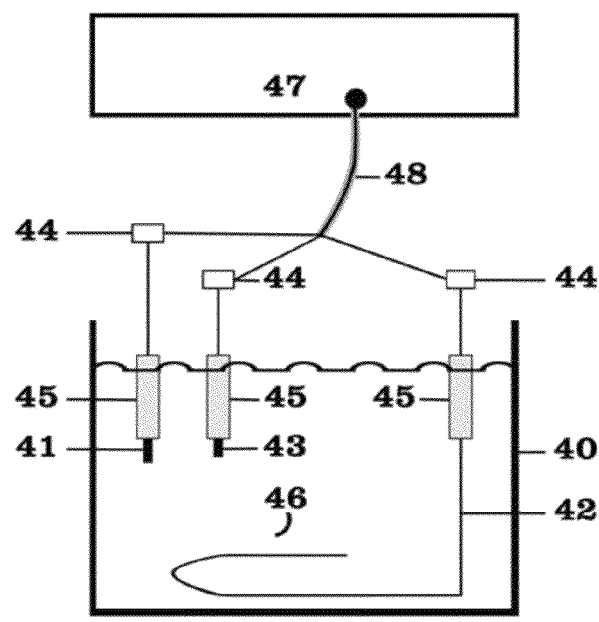
FIG. 4 is a schematic depiction of a half-cell experimental arrangement wherein voltage and current for the half cell are measured in order to provide a cyclic voltammogram.

In FIG. 4 a half-cell experimental arrangement for generating a cyclic voltammogram includes: a container 40 with a working electrode 41—the electrode being investigated which in this case was a length of cobalt wire; and a counter electrode 42, in this case a platinum wire coil, immersed in an electrolyte 46. Also separately immersed in the electrolyte 46 is a reference electrode 43, in this case nickel wire with a nickel oxide coating positioned in the electrolyte 46 at a location where it will be undisturbed by the greater part of chemical reactions occurring within the cell. The reference electrode 43 permits measurement of the electrical potential across the working electrode 41 using a scanning potentiostat instrument 47 connected through connectors 44 and multi-strand wiring 48. Simultaneously the current flow through the cell is measured by the instrument 47 which provides the output for FIG. 5.

Voltage generated by the instrument 47 is applied between the reference electrode 43 and the working electrode 41. This voltage between the working electrode 41 and reference electrode 43 is displayed on the "X" axis of FIG. 5. Current flow passing between the working electrode 41 and the counter electrode 42 is also measured by the potentiostat instrument 47. This current flow is displayed on the "Y" axis of FIG. 5 using the convention where the reduction current is negative and the oxidation current is positive.

The external potentiostat 47 applies an approximately triangular waveform electromotive potential to the working electrode 41 during the full voltammogram cycle. The applied voltage waveform used to produce FIG. 5 was programmed to linearly vary the potential of the working electrode 41 with respect to the reference electrode 43 from 0.0 volts to −3.2 volts at the rate of −50 mV/s in the first portion of the cycle, and then linearly increases this potential back to +0.5 V during the second half of the cycle, finally returning this voltage to 0.0 V at the end. The corresponding measured current was used to construct FIG. 5.

The working electrode 41 is contained within a shrink-fitted Teflon sleeve 45 that provides a defined exposed electrode area on the portion of the cobalt wire that is fully submerged in the electrolyte 46. The exposed area of the cobalt electrode was 0.20 cm$^2$. The electrolyte 46 throughout the test was molten $LiNO_3$—$KNO_3$ maintained at 227° C. The reference electrode 43 is similarly contained within a shrink-fitted Teflon sleeve 45.

Figure 5:
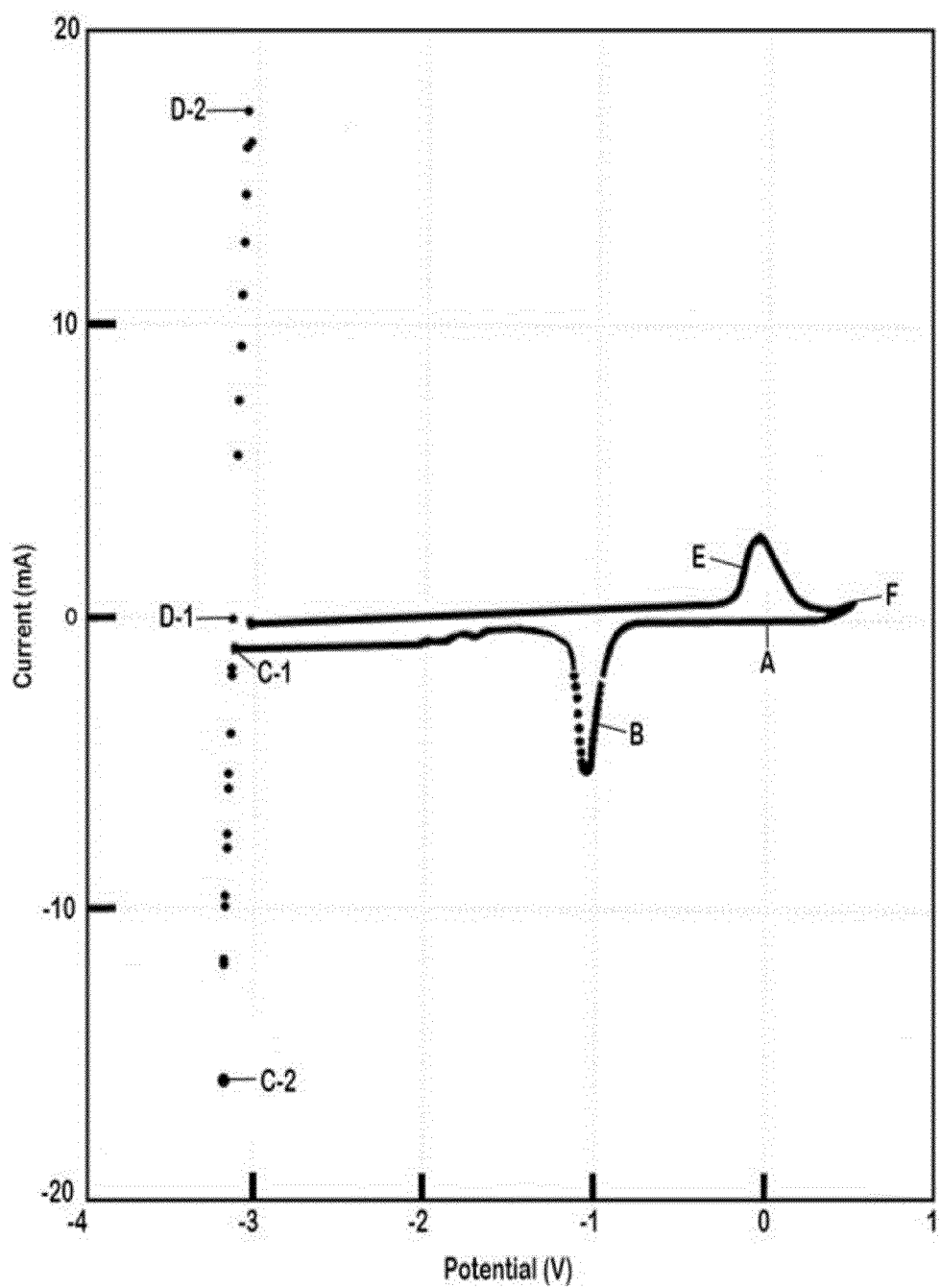
FIG. 5 is a cyclic voltammogram based on the arrangement of FIG. 4 showing the measured current as a function of applied voltage for the main battery reactions according to the invention using a cobalt electrode and a lithium nitrate-potassium nitrate eutectic mixture serving as the electrolyte. The electrochemical system is operated through one cycle of scanning the potential over the range corresponding to the charging and discharging of a battery according to the invention.

The current flow progresses through the following stages as shown in FIG. 5:

A—the scan begins at a measured potential of 0.0 Volts imposed by the external voltage source from the potentiostat 47 with the controlled potential becoming more negative at the rate of −50 mV/s. The measured current flow initially is near 0.0 milliamps while the increasing negative voltage values on the "X" axis move progressively to the left in the FIG. 5.

B—the measured current passes through a negative current peak or excursion due to the reduction of lithium nitrate to lithium nitrite with the formation of a lithium oxide ($Li_2O$) layer on the working electrode 41. After returning to near zero negative milliamps as the potential scan continues, the current suddenly increases to high negative values starting at C-1 when the voltage reaches approximately −3.1 V.

C-1 to C-2—reduction of lithium ions to form lithium metal on the working electrode 41 occurs while the applied voltage drives increasing negative current through the cell 40.

The potential scan reaches its set negative limit when the measured potential reaches −3.2 V at C-2 and then reverses direction. The current then rapidly decreases towards zero and becomes positive near −3.1 V at D-1.

D-1 to D-2—reversible oxidation of lithium metal to form lithium ions that gives a positive current during the initial stage of the reverse potential scan. From the minimum positive current, D-1, towards D-2 the positive current increases to a maximum value. The positive current then drops abruptly to near zero as the lithium metal is depleted.

E—conversion of the lithium oxide ($Li_2O$) previously formed on the working electrode 41 at stage B to form lithium ions and oxygen gas creates a positive current peak.

F—the potential sweep continues in the positive direction at a rate of 50 mV/s until the set potential of +0.5 V is reached. The potential scan is then again reversed and ends at 0.0 V.

The reactions at C-1 to C-2 and D-1 to D-2 correspond respectively to the charging and discharging steps for the lithium electrode in a lithium-air battery while the reactions at B and E correspond to the formation and removal of $Li_2O$ at the cathode in such a battery.

FIG. 5 shows the excellent reversibility for the lithium electrode reaction in a $LiNO_3$—$KNO_3$ electrolyte 46 at 227° C. This cyclic voltammogram was obtained using a potential scan rate of 50 mV/s. The potential scan shows the sharp increase in the reduction (negative) current at C-1. This sudden increase in the negative current over region C-1 to C-2 is associated with the reduction of lithium ions 20 to form lithium metal 30 represented by the following reaction:

$$Li^+ + e^- \rightarrow Li \quad (1)$$

After the applied potential scan is reversed at -3.2 V the reduction current for this reaction rises from location D-1 on the graph to a peak positive value at location D-2 on the graph, and then rapidly declines to a positive near zero value. This positive current is due to the oxidation of lithium metal and is represented by the reverse of reaction 1 and abruptly declines when the lithium metal is depleted.

The increasing oxidation current on the return portion of the test progressing from D-1 to D-2 is due to the positive increase in the applied voltage which allows more rapid oxidation of the lithium metal. This oxidation current abruptly decreases at D-2 with the final depletion of the lithium metal previously formed on the cobalt working electrode 41.

This experiment gave a reversible $Li^+/Li$ voltage potential of -3.137 V (at zero net current) with respect to the Ni/NiO reference electrode 43 that was immersed in the molten $LiNO_3$—$KNO_3$ electrolyte 46. The straight line from C-2 to D-2 at the extreme negative ends of this potential scan indicates fast electrode kinetics for the $Li^+/Li$ reaction in molten nitrates and reflects mainly linear Ohm's Law (E=IR) behavior. Electrochemical Impedance Spectroscopy (EIS) measurements for this same experiment verified very fast electrode kinetics for the reversible lithium anode in molten nitrate electrolytes. These results also show that the protective lithium oxide film that acts as a solid electrolyte interface (SEI) is an excellent conductor of lithium ions.

FIG. 5 is also instructive in respect of the reactions occurring at the cathode in a corresponding lithium-air battery used with a molten $LiNO_3$—$KNO_3$ electrolyte. In this experiment, free dissolved oxygen was removed from the electrolyte by diffusing argon gas through the melt for about 15 minutes. The peak near -1.1 V at B corresponds to the reduction of nitrate ions ($NO^-_3$) to form nitrite ions ($NO^-_2$) in the form of $LiNO_2$ and insoluble $Li_2O$ on the surface of the cobalt working electrode 41. This is represented by $$2Li^+ + LiNO_3 + 2e^- \rightarrow LiNO_2 + Li_2O \quad (2)$$

Further reaction is blocked thereafter by the insoluble $Li_2O$ layer formed on the surface of the cobalt working electrode 41 until the extreme negative potential required thermodynamically for the reduction of lithium ions is reached.

On the subsequent positive (oxidation) current flow portion of the potential scan at E in FIG. 5, this insoluble $Li_2O$ layer is converted back to lithium ions and oxygen at a potential near -0.2 V. This reaction can be summarized by $$Li_2O \rightarrow 2Li^+ + \tfrac{1}{2}O_2 + 2e^- \quad (3)$$

This is simply the reverse of the oxygen electrode reaction in lithium-air batteries where $Li_2O$ is the product at the oxygen cathode. Thus, this reaction is readily reversible as required for a rechargeable lithium-air battery. In fact, repeated cycles of the potential scan shown in FIG. 5 showed no measurable changes. From FIG. 5, we can estimate that the cell voltage for the lithium-air battery under these conditions would be close to 2.9 V in molten $LiNO_3$—$KNO_3$ at 227° C.

For studies where the $LiNO_3$—$KNO_3$ electrolyte is exposed to air provided over the upper surface of the melt, negative currents have been observed due to the reduction of oxygen gas. Rather large reduction currents of about $10^{-2}$ $A/cm^2$ have been measured for the reaction of oxygen. In fact, when the $LiNO_3$—$KNO_3$ electrolyte is exposed to air, negative currents for the reduction of oxygen have even been observed on the anodic (positive) potential scan. These studies all indicate good electrode kinetics for the oxygen electrode reaction in molten $LiNO_3$—$KNO_3$. Furthermore, expensive electrode catalysts such as platinum and gold will not be required to obtain fast oxygen electrode reactions. Good results can be obtained for the oxygen electrode reaction in the molten nitrate electrolyte by simple cathode structures such as nickel, cobalt, or stainless steel screens instead of porous cathodes.

A principle feature of the use of a molten nitrate electrolyte for lithium-air batteries is the following equilibrium reaction:

$$2NO^-_3 \rightleftharpoons 2NO^-_2 + O_2 \quad (4)$$

as has been reported for molten nitrate systems. This equilibrium reaction is an internal source for oxygen that will help replenish the oxygen supply in the nitrate system. As oxygen is consumed by the reduction reaction, this equilibrium will supply replacement oxygen to the cathode. This allows much larger current densities to be attained in this molten nitrate electrolyte than typical in organic electrolytes near room temperatures that rely on oxygen permeable cathodes. In addition, the nitrate ions, which are a major component of these electrolytes, can also convey oxygen to the cathode for reduction to nitrite ions and oxygen ions. Furthermore, a nitrate-based electrolyte is not flammable in the manner of organic electrolytes.

According to this invention, an entirely different mechanism for oxygen reduction is possible at the cathode which involves the electrochemical reduction of nitrate ions. This reaction step is represented by:

$$2LiNO_3 + 4Li^+ + 4e^- = 2Li_2O + 2LiNO_2 \quad (5)$$
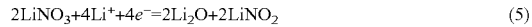

The nitrate ions, therefore, serve as a conveyer of oxygen to the cathode to form the lithium oxide. The second step is the direct chemical reaction of the nitrite ions ($NO_2$) with oxygen supplied separately or subsequently to the melt:

$$2LiNO_2 + O_2 \rightarrow 2LiNO_3 \quad (6)$$

The sum of reactions (5) and (6) gives the same net results as the direct reduction of oxygen $$O_2 + 4Li^+ + 4e^- = 2Li_2O \quad (7)$$

and the formation of lithium oxide as required for lithium-air batteries.

Other Issues
Anode Solid Electrolyte Interface

The protection of the lithium anode depends on the solubility of the oxides present on the lithium surface. Ideal solubility calculations yield useful predictions for the solubility of oxides, as well as other substances, in molten nitrates. Examples of several calculations of ideal solubility for substances important in this patent disclosure are given in Table I. As shown in Table I and confirmed by experiments, $Li_2O$ is much less soluble than $K_2O$ or $K_2O_2$.

TABLE I

Ideal solubility of several metal oxides
in molten nitrates at 500 Kelvin (223° C.).

| Metal Oxide | $X_1{}^a$ | $m_1$(moles/kg)$^b$ | $T_m$(K) | $\Delta H_{fus}$(kJ/mol) |
|---|---|---|---|---|
| CaO | $1.23 \times 10^{-7}$ | $1.40 \times 10^{-6}$ | 2886 | 80 |
| MgO | $1.80 \times 10^{-7}$ | $2.05 \times 10^{-6}$ | 3098 | 77 |
| $Li_2O$ | $3.46 \times 10^{-5}$ | $3.95 \times 10^{-4}$ | 1843 | 58.6 |
| $Na_2O$ | $6.13 \times 10^{-4}$ | $6.99 \times 10^{-3}$ | 1407 | 47.7 |
| $K_2O$ | $3.73 \times 10^{-2}$ | $4.42 \times 10^{-1}$ | 1013 | 27 |
| $Na_2O_2$ | $6.17 \times 10^{-2}$ | $7.50 \times 10^{-1}$ | 948 | 24.5 |
| $K_2O_2$ | $1.21 \times 10^{-1}$ | 1.57 | 763 | 25.5 |
| $KO_2$ | $3.13 \times 10^{-1}$ | 5.20 | 653 | 20.6 |

Note:
Experimental data was not available for $Li_2O_2$ but the measured solubility was significantly greater than for $Li_2O$ in molten nitrates.
$^a$Ideal solubility in mole fraction given by $\ln X_1 = \Delta H_{fus}(T - T_m)/RTT_m$
$^b$Ideal solubility in molal units (moles/kg) given by $m_1 = 11.403 X_1/(1 - X_1)$ Due to the plentiful potassium ions in the preferred lithium nitrate-potassium nitrate eutectic (59 mole % potassium nitrate), potassium oxide ($K_2O$), potassium peroxide ($K_2O_2$), and potassium superoxide ($KO_2$) are possible products of the cathode reaction. However, these potassium oxides are all much more soluble than $Li_2O$ (see Table I). Thus insoluble $Li_2O$ would likely be the main final product of the reaction at the cathode in molten nitrate systems containing lithium nitrate-potassium nitrate mixtures.

From this Table it can be seen that calcium and magnesium oxides are even less soluble than lithium oxide. Consequently such oxides can add stability to the protective oxide film on the anode, reducing self-discharge arising from reaction between lithium in the anode and nitrates in the electrolyte. Calcium and magnesium introduced into the cell as nitrates in small quantities, e.g. less than 5 mole %, will provide a supplementary protective effect.

Other Electrolyte Mixtures

A possible modification of this invention is to use other molten nitrate eutectics. However, any nitrate eutectic used must contain sufficient $LiNO_3$ to stabilize the lithium anode and serve as an abundant supply of lithium ions for the anodic reactions. The amount of $LiNO_3$ in the melt must be greater than 20 mole % to achieve a reasonably effective performance. Many different nitrate eutectics have been investigated for use in lithium-air batteries, and these are shown in Table II.

TABLE II

Molten Nitrate Eutectics Investigated.

| Electrolyte | Mole % | Melting Point (° C.) |
|---|---|---|
| $LiNO_3$—$KNO_3$—$CsNO_3$ | 31-36-33 | 115 |
| $LiNO_3$—$KNO_3$ | 41-59 | 124 |
| $LiNO_3$—$RbNO_3$—$CsNO_3$ | 64-29-7 | 145 |
| $LiNO_3$—$CsNO_3$ | 60-40 | 170 |
| $LiNO_3$—$RbNO_3$ | 66-34 | 180 |

Any of these listed compositions would be suitable for use as the electrolyte for the present invention. The addition of small amounts of other lithium compounds such as lithium sulfate ($Li_2SO_4$) or lithium phosphate ($Li_3PO_4$) could provide a further lowering of the melting points. Lithium perchlorate ($LiClO_4$) and lithium chlorate ($LiClO_3$) could also be used as part of the electrolyte mixture.

No eutectic melts involving sodium nitrate ($NaNO_3$) are included in Table II because it was found both by thermodynamic calculations and experimental measurements that this nitrate salt makes the lithium anode less stable. This is because the sodium ions can enter into a displacement reaction with lithium metal to form the more reactive sodium metal or sodium-lithium alloys. This displacement reaction can be represented by $$Na^+ + Li \rightarrow Na + Li^+ \qquad (8)$$

Sodium metal (Na) has a much lower melting point (97.80° C.) than lithium metal and is much more reactive. Therefore, Equation 8 must be suppressed from occurring by keeping sodium ions out of the nitrate melts.

The other molten nitrate eutectics shown in Table II offer no substantial advantages over the $LiNO_3$—$KNO_3$ eutectic. The rubidium nitrate ($RbNO_3$) and cesium nitrate ($CsNO_3$) compounds are much more expensive than either $LiNO_3$ or $KNO_3$. Nitrates of alkaline earth metals such as magnesium nitrate, $Mg(NO_3)_2$, and calcium nitrate, $Ca(NO_3)_2$, may also be considered, but while they may work, they offer no significant advantages in melting points or in most other properties for applications in lithium-air batteries. However, additions of limited quantities of those nitrates increase the stability of the lithium anode due to the low solubility of their oxides, CaO and MgO, in nitrate melts (see Table I).

Deformation of Lithium Anode

Shape changes can be a problem for repeated cycles of charging and discharging of anodes consisting of Li—Al, Li—Co or other lithium anode materials. For example, an aluminum sheet electrode tends to bend and curl on cycling due to formation of Li—Al within the aluminum metal. Therefore, the Li—Al, Li—Co, or Li—Fe anode may preferably be formed into small metal particles contained within a metallic containment screen. This containment screen can be formed from Ni, Co, Fe or other transition metals compatible with the electrolyte. Another method of stabilizing the anode is the bonding of the metal particles to a conductive substrate such as a nickel screen. Lithium-intercalation anodes as presently used in lithium-ion batteries can also be used to minimize deformation effects.

Water

It is known that water ($H_2O$) creates problems for lithium-air battery systems. Methods used in lithium-air batteries to minimize the effect of water include the removal of water from the inlet of air and the encapsulation of the lithium anode with ceramic materials that block the contact of water with the lithium anode. These same methods can be used for lithium-air batteries using molten nitrate electrolytes. Furthermore, the high operating temperature of 150 to 225° C. is well above the boiling point of water (100° C.) and this will help to minimize the water content in the molten nitrate electrolyte. In addition, the oxygen gas production during the charging process will help to drive off water.

Temperature of the Electrolyte

It is possible that the molten nitrate electrolyte will need to be maintained in the liquid state and not be allowed to freeze absent good engineering design for the cells. Good insulation around the battery will help maintain the high temperature. Also, the heat generated by the charging process will also help maintain the liquid state. Additional means may include an internal battery heating system run off the electrical grid or provided by a small internal generator or current source. In high current situations where internal resistance of the cell generates excessive heat, then cooling may be required to keep the battery in its preferred temperature operating range (150° C. to 225° C.).

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A rechargeable molten nitrate salt electrolyte battery, comprising:
   a) an electrolyte comprising lithium nitrate which electrolyte is capable upon being heated above its melting point of becoming an ionically conductive liquid containing lithium ions and nitrate ions, the lithium nitrate being present at a level sufficient to provide stability for a protective solid electrolyte interface formed on lithium metal on contact with the electrolyte,
   b) an anode comprising lithium immersed in the electrolyte, the anode and the electrolyte being compatible with each other for introducing lithium ions into the electrolyte and having a stable layer of lithium oxide serving as the solid electrolyte interface formed on the surface of the lithium in contact with the electrolyte,
   c) a cathode electrode immersed in the electrolyte comprising an electrically conductive surface that is compatible with the electrolyte and capable of transferring electrical charge to or from chemical compounds, namely nitrate ions and oxygen, present within the electrolyte,
   d) oxygen atoms present within the electrolyte in the form of nitrate ions to serve as an internal source of oxygen within the electrolyte for providing oxygen atoms to be delivered, when the electrolyte is at a temperature above its melting point, through the electrolyte to the cathode electrode for reaction at the cathode whereby during battery discharge one or more lithium oxides are formed,
   e) electrical connections respectively present on the anode and cathode and electrically connected to the lithium in the anode and the electrically conductive surface of the cathode electrode for connecting the battery to an external circuit which will allow current to flow through the battery in conjunction with electrochemical reactions occurring at the anode and cathode electrode,
   f) a diffuser of external oxygen positioned within the electrolyte to introduce into the electrolyte oxygen gas from an external oxygen source to provide the direct reduction of the oxygen at the cathode as well as the reduction of the oxygen by a homogeneous chemical reaction with nitrite ions present in the electrolyte to form nitrate ions, and
   g) surfaces within the cell electrolyte for collecting lithium oxide formed during battery discharge, said surfaces being electrically connected to the cathode electrode for the lithium oxide to be dissociated into lithium ions and oxygen during battery recharging,
   wherein, when operated as a battery, the anode and cathode reactions are reversible in accordance with the polarity of the current flowing through the battery thereby providing a molten salt electrolyte battery which is rechargeable.

2. The battery of claim 1, comprising nitrite ions formed during battery discharge, in combination with oxygen introduced into the electrolyte from the external oxygen source for effecting a homogeneous chemical reaction with the nitrite ions to form nitrate ions and thereby replenish oxygen atoms depleted from the internal source of oxygen.

3. The battery of claim 2, wherein the electrolyte comprises oxygen in solution which constitutes a portion of the internal source of oxygen.

4. The battery of claim 3, wherein the electrolyte comprises as well as said lithium nitrate salt one or more additional salts compatible with battery operation which form a mixture with a melting temperature below that of pure lithium nitrate.

5. The battery of claim 4, wherein the electrolyte comprises a mixture of lithium nitrate and potassium nitrate with a melting temperature below that of pure lithium nitrate.

6. The battery of claim 4, wherein the electrolyte consists of lithium nitrate or a mixture of lithium nitrate and another nitrate salt excluding sodium nitrate which form a mixture with a melting temperature below that of pure lithium nitrate.

7. The battery of claim 1, wherein the cathode electrode surface comprises a conductive metal selected from the group consisting of nickel, iron, cobalt, copper, silver, chromium, platinum, and ruthenium or combinations thereof.

8. The battery of claim 7, wherein the anode comprises a lithium-aluminum alloy.

9. The battery of claim 7, wherein the anode comprises a material selected from the group consisting of a lithium-silicon alloy, a lithium-calcium alloy, a lithium-magnesium alloy, a lithium-boron alloy.

10. The battery of claim 7, wherein the anode comprises lithium which is immobilized with a metal selected from the group consisting of nickel, cobalt, and iron.

11. The battery of claim 1, wherein the surfaces within the cell electrolyte for collecting lithium oxide comprise a horizontal surface portion at the base of the cathode upon which oxides formed during discharge will be collected to facilitate the recharge cycle by positioning such oxides in close proximity to the cathode during the recharge cycle.

12. The battery of claim 1, comprising calcium or magnesium ions in the electrolyte in an amount sufficient to provide calcium or magnesium oxide as a portion of the stable layer of lithium oxide formed on the lithium anode.

13. The battery of claim 12, wherein the electrolyte of the battery is substantially free of sodium ions.

14. The battery of claim 13, wherein the electrolyte of the battery is substantially free of chloride ions.

15. The battery of claim 14, wherein the electrolyte of the battery is substantially free of water.

16. A method of using the molten salt electrolyte battery of claim 1, wherein the electrical connections of the battery of claim 1 are connected to each other through an external circuit to permit a battery discharge current to flow through the battery while providing oxygen to oxygen diffuser from the external oxygen source.

17. A method of using the molten salt electrolyte battery of claim 1 wherein the electrical connections of the battery of claim 1 are connected to each other through an external circuit which includes an electromotive source which causes current to flow through the battery to effect battery recharging by dissociation of lithium oxide present on the lithium oxide collection surfaces.

18. A method of operating a rechargeable molten salt electrolyte battery, the battery having:
  a) an electrolyte comprising lithium nitrate which electrolyte is capable of becoming an ionically conductive liquid upon being heated above its melting point,
  b) an anode comprising lithium that is compatible with the electrolyte for introducing lithium ions into the electrolyte, and
  c) a cathode electrode comprising an electrically conductive surface material that is compatible with the electrolyte,
  comprising the step of providing during battery discharge oxygen to the electrolyte for reaction at the cathode to form lithium oxides by introducing external oxygen into the battery through the electrolyte.

19. The method of claim 18, wherein the oxygen which is provided to the electrolyte reacts homogeneously with nitrite ions present therein to form nitrate ions which provide at least a portion of the oxygen within the electrolyte for reaction at the cathode.

* * * * *